United States Patent
Seger et al.

(10) Patent No.: US 9,038,808 B2
(45) Date of Patent: May 26, 2015

(54) METHOD FOR STORING AND TRANSPORTING PRODUCTS AND A LOW PRESSURE STORAGE DEVICE THEREFOR

(75) Inventors: Martin Seger, Neumarkt (DE); Johann Hüttner, Mallersdorf-Pfaffenberg (DE)

(73) Assignee: KRONES AG, Neutraubling (DE)

( * ) Notice: Subject to any disclaimer, the term of this patent is extended or adjusted under 35 U.S.C. 154(b) by 1549 days.

(21) Appl. No.: 12/665,063

(22) PCT Filed: Jun. 24, 2008

(86) PCT No.: PCT/EP2008/005108
§ 371 (c)(1),
(2), (4) Date: Apr. 2, 2010

(87) PCT Pub. No.: WO2009/012857
PCT Pub. Date: Jan. 29, 2009

(65) Prior Publication Data
US 2014/0318926 A1    Oct. 30, 2014

(30) Foreign Application Priority Data

Jun. 25, 2007   (EP) .................................. 07012378

(51) Int. Cl.
*B65G 1/02* (2006.01)
*B65G 47/51* (2006.01)
*B65G 47/68* (2006.01)

(52) U.S. Cl.
CPC *B65G 1/02* (2013.01); *B65G 47/51* (2013.01); *B65G 47/68* (2013.01); *B65G 47/5113* (2013.01); *B65G 47/682* (2013.01); *B65G 2201/0244* (2013.01)

(58) Field of Classification Search
CPC .......... B65G 1/02; B65G 47/51; B65G 47/68
USPC ............................................ 198/347.1, 347.4
See application file for complete search history.

(56) References Cited

U.S. PATENT DOCUMENTS

| | | | |
|---|---|---|---|
| 3,040,870 A | 6/1962 | Carter | |
| 4,361,759 A | 11/1982 | King et al. | |
| 4,401,207 A * | 8/1983 | Garvey | 198/580 |
| 6,168,005 B1 * | 1/2001 | Petrovic | 198/347.4 |
| 6,575,287 B2 * | 6/2003 | Garvey et al. | 198/418.6 |
| 6,612,417 B2 * | 9/2003 | Garvey | 198/443 |
| 6,612,425 B1 * | 9/2003 | Garvey | 198/839 |
| 6,648,124 B1 * | 11/2003 | Garvey | 198/418.6 |
| 6,959,802 B1 * | 11/2005 | Garvey | 198/347.1 |
| 6,964,329 B1 * | 11/2005 | DiBianca et al. | 198/443 |
| 2007/0251801 A1 * | 11/2007 | Garvey | 198/347.1 |

FOREIGN PATENT DOCUMENTS

DE   2504264 A1   8/1976
EP   1144285 A1   10/2001

(Continued)

*Primary Examiner* — Leslie A Nicholson, III
(74) *Attorney, Agent, or Firm* — Marshall, Gerstein & Borun LLP

(57) ABSTRACT

A method for storing and transporting products in a low-pressure storage device and a low-pressure storage device therefore, to allow product storage in a simple manner, and to control the storage in a simple manner. The products transfer on a first storage path and on a second storage path that is arranged directly next to the first storage path, during the storage operation of the storage device.

25 Claims, 5 Drawing Sheets

(56) References Cited

FOREIGN PATENT DOCUMENTS

| EP | 1323650 | A1 | 7/2003 |
|---|---|---|---|
| EP | 1380522 | A1 | 1/2004 |
| EP | 1681249 | A1 | 7/2006 |
| JP | 63047223 | A | 2/1988 |
| JP | 2000302232 | A | 10/2000 |
| JP | 2001240238 | A | 9/2001 |

* cited by examiner

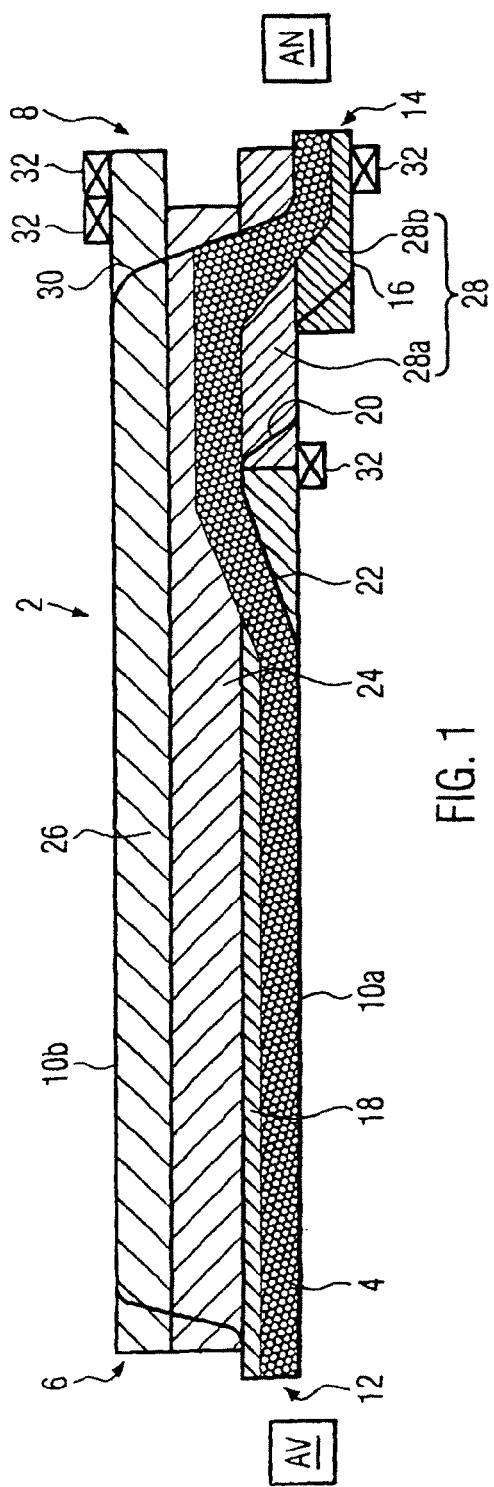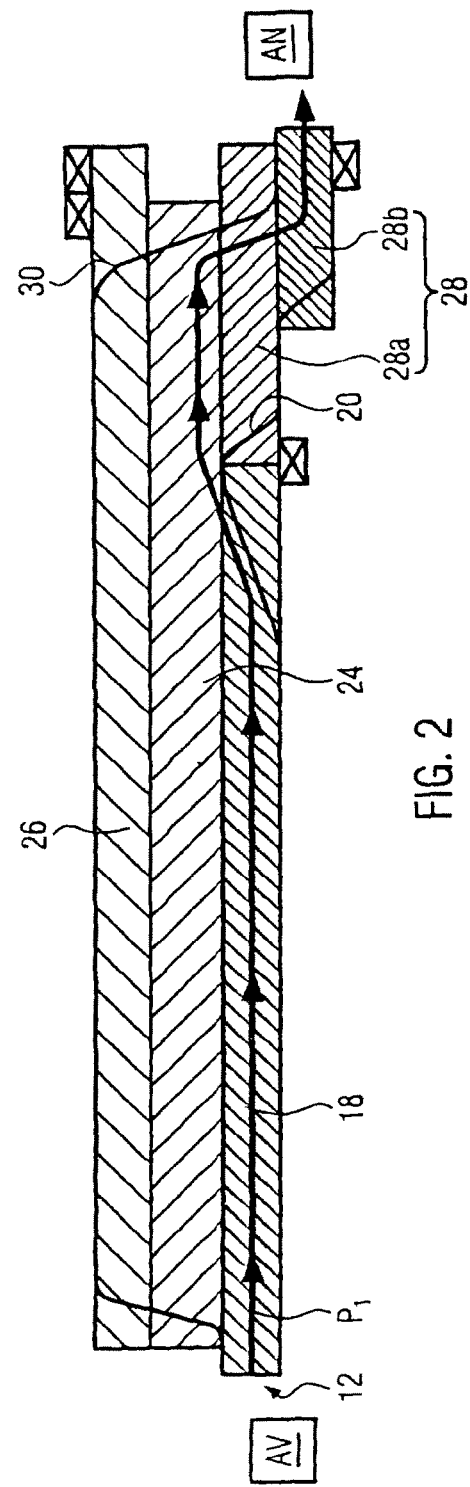

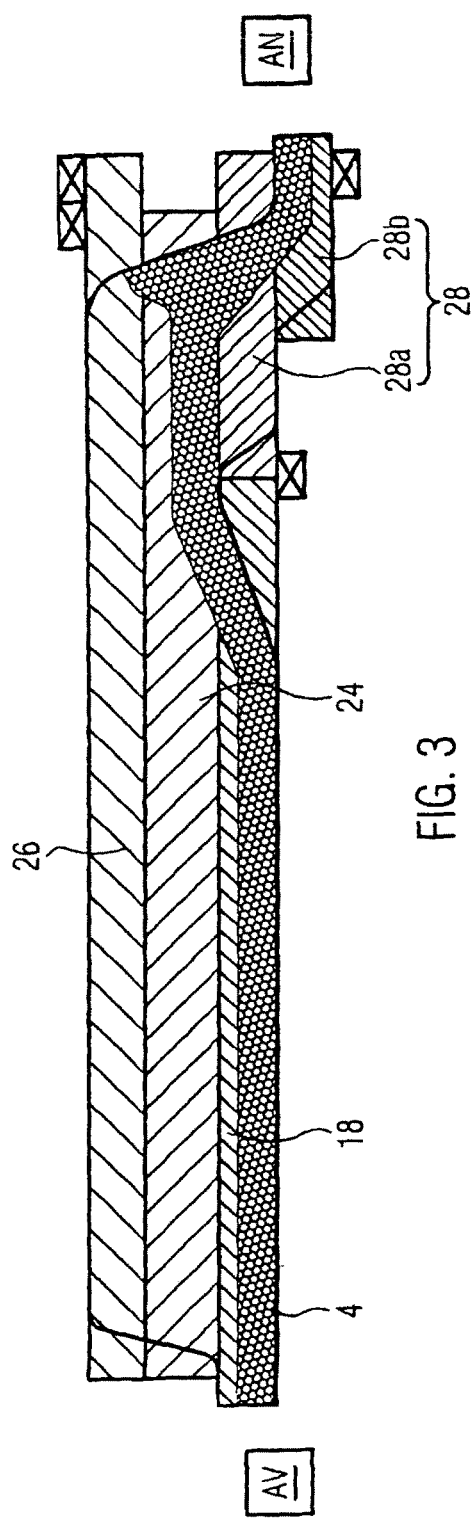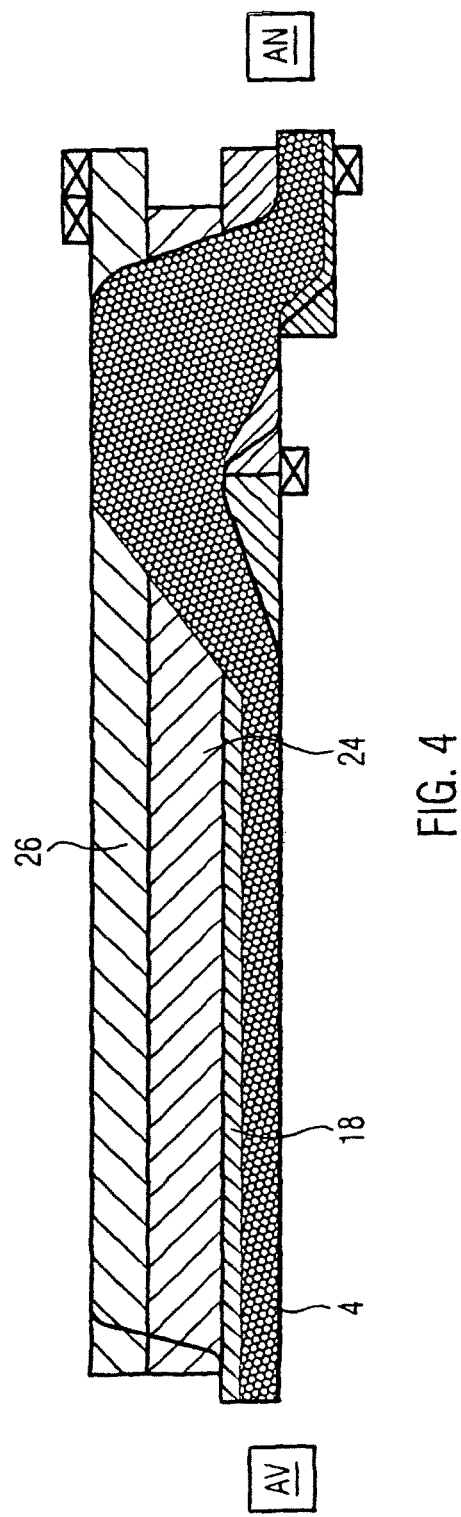

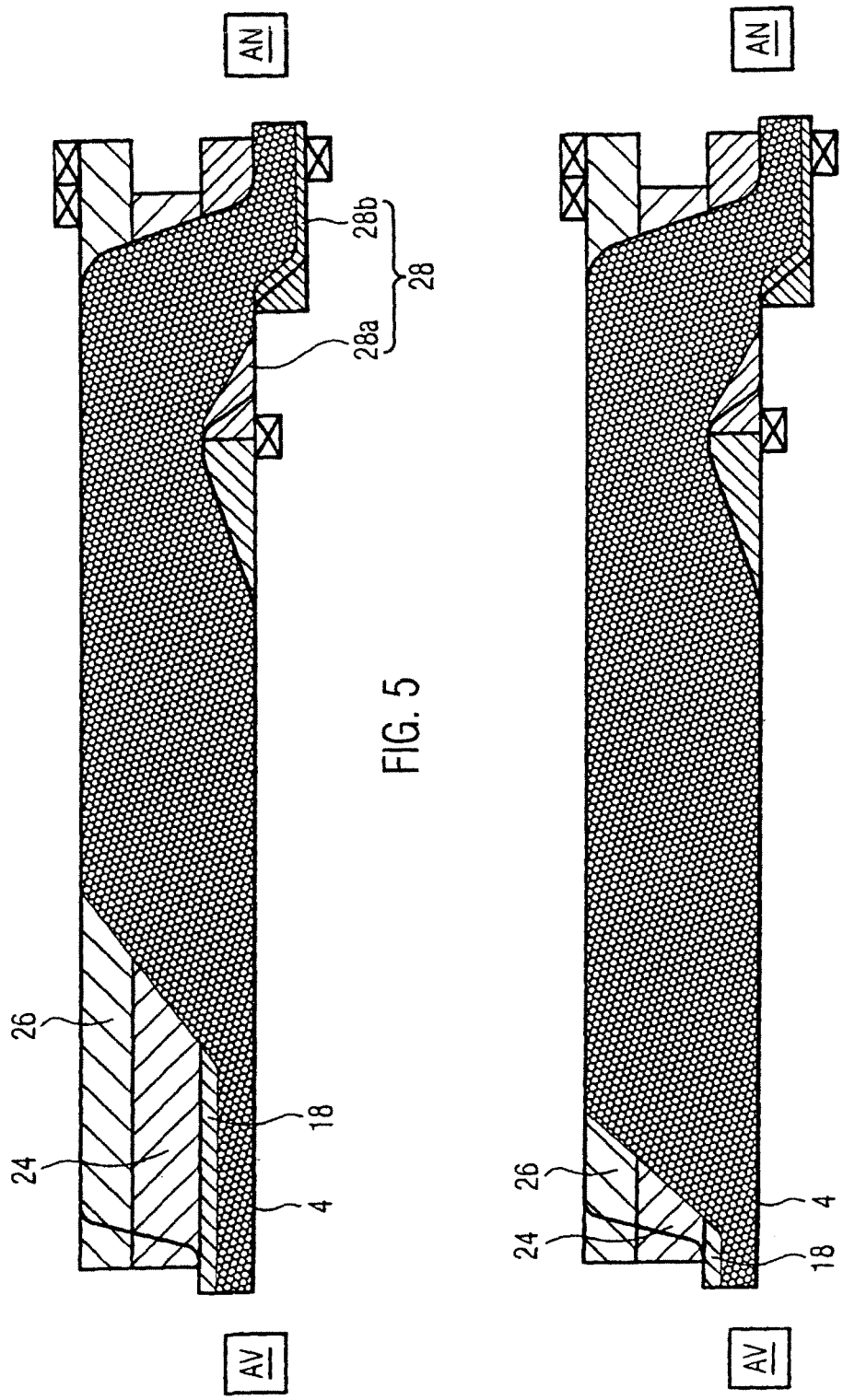

US 9,038,808 B2

METHOD FOR STORING AND TRANSPORTING PRODUCTS AND A LOW PRESSURE STORAGE DEVICE THEREFOR

CROSS-REFERENCE TO RELATED APPLICATION

The present application claims the benefit of priority of International Patent Application No. PCT/EP2008/005108, filed Jun. 24, 2008, which application claims priority of German Patent Application No. 07012378.1, filed Jun. 25, 2007. The entire text of the priority application is incorporated herein by reference in its entirety.

FIELD OF THE DISCLOSURE

The present disclosure relates to a method for storing and transporting products in a low-pressure storage device and to a low-pressure storage device, such as used in container filling operations.

BACKGROUND

It is generally known from the prior art that the material flow between individual work stations, for example in a filling and packaging facility, is decoupled by storage devices or storage tables. Such a storage device is e.g. provided downstream of a filling machine and upstream of a packaging machine. With the help of the storage device it is possible to prevent a complete standstill of the filling and packaging facility in the event of a short malfunction of the packaging machine. In this case the products supplied by the filling machine are temporarily stored by the storage device. Therefore, the products can be continuously transported in a facility even in the case of operating speeds varying at individual work stations.

DE 25 04 264 A1 discloses a storage device having a first feed path, a storage path and a second feed path provided between the first feed path and the storage path. In this known storage device, the products are transported during normal operation just via the first feed path from a first end with an inlet to a second end of said storage device having an outlet. Hence, during normal operation of the storage device the second feed path and the storage path are deactivated, and the products are moved in a straight movement through said known storage device. In the event of malfunctions of a work station that is arranged downstream of the storage device, the product is accumulated at the end of the storage device comprising the outlet because the first feed path of the storage device is still operated and further products are fed to the storage device from an upstream work station to said device. The accumulated products are transferred via an inlet opening provided laterally relative to the first feed path near the inlet of the storage device to the second feed path and the storage path. A reservoir is thereby built up next to the first feed path. The storage device is now operated such that the second feed path and the storage path are also activated. Hence, the storage path according to this known device has only a function during the storing operation of the storage device. The products are transported via the storage path and the second feed path towards the outlet of the storage device. As soon as the downstream work station is operated again under normal operational conditions, the products stored on the storage path and on the second feed path will be discharged. After the reservoir has been emptied and a dynamic equilibrium has been reached, the second feed path and the storage path are again deactivated.

The prior art also discloses storage devices in the case of which the storage path is operated both during normal operation and during storage operation of the storage device. Such a device is known from EP 1 144 285 B1, which is regarded as generic for the method and the device of the present disclosure.

EP 1 144 285 B1 discloses a storage device in which storage paths are provided on both sides of a feed path. The feed path and the storage paths according to this known device are thus configured to be alternating. In contrast to the storage device known from DE 25 04 264 A1, the output rate of the products during normal operation of the storage device also depends on the speed of the storage path in the storage device according to EP 1 144 285 B1.

Although the device known from EP 1 144 285 B1 offers the advantage that operational variations in the upstream work station can be offset for a short period of time, the control efforts required for this known storage device are great, the reason being that reservoirs are formed at both sides of the feed path. In a storage device with e.g. two feed paths, three different reservoirs are thus built up.

In case of a malfunction in this storage device, which malfunction is e.g. caused by a product that has been tilted in the storage path between the two feed paths, it is only under considerable efforts that said product can be put upright again. Since the storage path is enclosed by the two feed paths, an operator's access to the reservoir between said two feed paths is limited. Moreover, since a multitude of reservoirs are alternately formed with respect to the feed paths according to this known storage device, it is complicated to monitor the respective reservoirs for rapidly detecting and eliminating malfunctions.

A storage device based on a similar constructional principle as the above-mentioned storage device known from EP 1 144 285 B1 is known from EP 1 380 522 B1. In the storage device according to EP 1 380 522 B1 a storage path is also provided on both sides of a feed path. Said known storage device is thereby subject to the same drawbacks as the storage device known from EP 1 144 285 B1.

SUMMARY OF THE DISCLOSURE

In consideration of the aforementioned generic storage devices it is an object of the present disclosure to provide a storage device which makes it possible to store the products in an easy way and to control the reservoirs in a simple manner. Moreover, it is an object of the present disclosure to provide a method for storing and transporting products, with which method it is also possible to store the products in an easy way and to control the reservoirs in a simple manner.

The products transported by way of the method according to the disclosure are e.g. upright containers, such as beverage bottles or beverage cans. According to the disclosure the products are transferred during the storing operation onto the first storage path and to a second storage path arranged directly next to said first path. Hence, the reservoir just builds up at one side of the feed path. This entails the advantage that the reservoir is controlled and monitored in a much simplified way. The reservoir can be accessed all the time because said reservoir is not enclosed between several feed paths. Every path that introduces the products via an inlet into the storage device is regarded as a feed path within the meaning of the disclosure.

According to a preferred embodiment the products leave the feed path in a first sideward movement in the half of the storage device that is the rear one in the direction of movement, and are transported in a second sideward movement opposite to the first sideward movement towards the outlet. The term sideward movement encompasses any movement that does not extend in the direction of the longitudinal axis of the storage device. The first sideward movement is carried out in the rear half of the storage device. The products introduced via the feed path into the storage device are thus moved over a relatively long distance in a straight line through the feed path. This optimizes the introduction of the products into the storage device because a relatively high feed path speed can be set owing to this relatively long straight movement of the products. The second sideward movement is opposite to the first sideward movement. The products are thus redirected at least twice between the inlet and the outlet of the storage device before they leave the storage device. This entails the advantage that the surfaces of the paths are optimally used and that only a small area is needed for this twofold redirection.

According to a preferred embodiment of the method according to the disclosure the products are transferred during normal operation of the storage device first from the feed path to the storage path arranged next to the feed path and from there to a discharge path arranged downstream of the feed path and are transported via said discharge path to the outlet. The two opposite sideward movements are thus carried out between the feed path and the discharge path. This further improves the discharge of the products.

According to a further preferred embodiment of the method according to the disclosure, the products are transported in the second sideward movement at least to such an extent that they leave the storage device in an extension of the feed path. In this preferred embodiment the distance covered by the products by way of the second sideward movement is at least as long as the distance covered by way of the first sideward movement of the products.

According to a further preferred embodiment of the method according to the disclosure, the products leave the storage device at a side of the feed path opposite to the storage path arranged next to the feed path. According to this preferred embodiment the distance covered by the products through the second sideward movement is longer than the distance covered by the first sideward movement of the products. This further enhances the adaptability of the storage device to speed variations in the downstream work station.

According to a preferred embodiment of the method according to the disclosure, the products leave the feed path in a first sideward movement in the half of the storage device that is the rear one in the direction of movement, and are transported in a second sideward movement, which takes place in the same direction as the first sideward movement, towards the outlet. According to this preferred embodiment both the first and the second sideward movement take place in the same direction. This entails the advantage that the output rate of the products from the storage device can be optimized.

The device according to the disclosure is characterized in that the second storage path is provided directly next to the first storage path. The construction of the storage device is thereby simplified considerably because the storage paths are only formed on one side of the feed path. "Directly next to" within the meaning of the disclosure is to be understood such that no further path, for example a feed path, is provided between the two storage paths. Hence, in the storage device according to the disclosure, all of the storage paths are formed on one and the same side relative to the feed path. The space is thereby used in a particularly optimized way, whereby a relatively compact storage device can be provided.

Every path that is in a position to temporarily store products between a feed path and a discharge path is regarded as a storage path within the meaning of the present disclosure.

A path of the storage device may e.g. be composed of a plurality of conveyor belts. Hence, the feed path, for instance, can be formed by a plurality of feed belts. Moreover, the respective belts of a path can be operated at different speeds.

According to a further preferred embodiment of the present disclosure, a discharge path is provided downstream of a storage path guide in a longitudinal extension of the feed path and next to the first storage path. A path which ejects the products out of the storage device is regarded as a discharge path within the meaning of the disclosure. Hence, a discharge path within the meaning of the disclosure is directly connected to an outlet of the storage device. A discharge path can be subdivided into a plurality of discharge belts that can be operated at different discharge belt speeds. If the discharge path is subdivided into a plurality of discharge belts, the discharge path speed follows from the mean value of the speeds of the respective discharge belts. The discharge path speed corresponds e.g. to the speed of a work station arranged downstream of the storage device, which is arranged directly on the outlet of the storage device.

According to a preferred development of the present disclosure, the storage paths and the feed path are controllable during the storing operation of the storage device in such a way that they satisfy the inequalities $v_{S1} > v_{S2}$ and $v_Z > v_{S1}$, where $v_{S1}$=storage path speed of the first storage path, $v_{S2}$=storage path speed of the second storage path, and $v_Z$=feed speed of the feed path. This accomplishes a flexible control of the reservoir.

According to a further preferred development of the present disclosure the storage paths and the feed path are controllable in the unstoring operation of the storage device in such a manner that they satisfy the inequalities $v_{S1} > v_Z$ and $v_Z > v_{S2}$. This optimizes the control of the reservoir during the unstoring operation, and said reservoir can thus emptied in an optimum way.

BRIEF DESCRIPTION OF THE DRAWINGS

Further details, advantages and features become apparent from the following description of embodiments taken in conjunction with the drawing, in which drawing:

FIG. 1 is a top view on a first embodiment of the storage device;

FIG. 2 shows the movement path of the products during normal operation of the storage device according to FIG. 1;

FIGS. 3 to 6 show the product flow during the storing operation of the storage device according to FIG. 1, FIGS. 7 and 8 show the product flow during the unstoring operation of the storage device according to FIG. 1.

DETAILED DESCRIPTION OF THE PREFERRED EMBODIMENT

Figure 7:
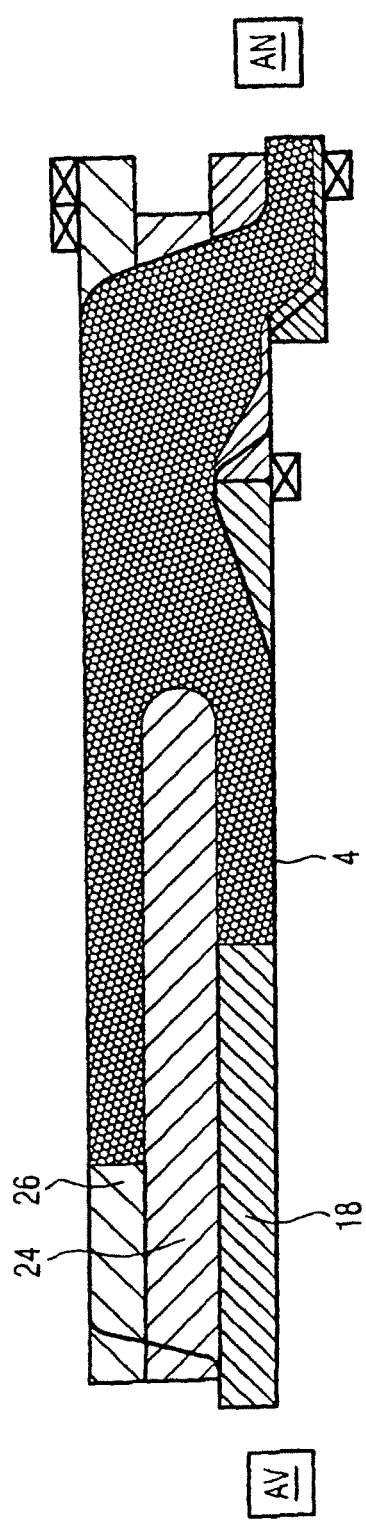

FIG. 1 shows a low-pressure storage device 2 in which bottles 4 can be stored, the storage device 2 being arranged between an upstream work station AV and a downstream work station AN. The storage device 2 has a first end 6, a second end 8 and two opposing longitudinal sides 10a, 10b. A lateral inlet 12 is formed next to the longitudinal side 10a on the first end 6. On the second end 8, a lateral outlet 14 is formed next to a side wall 16. The side wall 16 is arranged in parallel with the longitudinal side 10a and offset to the longitudinal axis of the longitudinal side 10a.

A feed path 18 extends between the inlet 12 and a storage path guide 20. The storage path guide 20 has an inverted U-shaped form with an elongated leg 22 when viewed from above. The leg 22 is connected with its one end to the longitudinal side 10a and forms a guide surface. The other end of the leg 22 ends in the area of a first storage path 24. Said first storage path 24 is arranged directly next to the feed path 18. A second storage path 26 is provided next to said first storage path 24.

Downstream of the feed path 18, and in longitudinal extension thereto, a discharge path 28 is formed that is subdivided into a first discharge belt 28a and a second discharge belt 28b. The second discharge belt 28b is arranged directly next to the side wall 16.

An outlet guide 30 is formed at the end of the storage paths 24, 26 and of the discharge belt 28a. Said outlet guide 30 extends from the second longitudinal side 10b over the second storage path 26, the first storage path 24 and the first discharge belt 28a up to the second discharge belt 28b. The outlet 14 is formed by the outlet guide 30 and the side wall 16.

A plurality of drives 32 are provided for driving the paths and belts independently of one another. The paths 18, 24, 26, 28 are driven such that the speeds thereof are variable.

The mode of operation of the device 2 shall now be described.

FIG. 2 shows the movement path $P_1$ of the bottles 4 through the storage device 2 during normal operation. Normal operation particularly stands for the state in which the upstream work station AV and the downstream work station AN are operated in conformity with their respective normal speeds.

FIG. 2 shows that during normal operation the bottles 4 are introduced through the feed path 18 into the storage device 2 at the inlet 12 and moved in a straight line up to the storage path guide 20 through the feed path 18. When reaching the storage path guide 20, the bottles 4 are moved sideways, i.e. they are moved in a direction deviating from the longitudinal extension of the storage device 2. Said sideward movement will be continued until the bottles 4 have been redirected to the first storage path 24. The bottles 4 are then moved in a straight line up to the outlet guide 30 through the first storage path 24. On the outlet guide 30 the bottles 4 are then moved sideways again. Said second sideward movement, however, is opposite to the first sideward movement. The second sideward movement will be continued until the bottles 4 have been transferred onto the second discharge belt 28b. The bottles 4 are then transported by this second discharge belt 28b in a straight line to the downstream work station AN.

During the above-described normal operation of the storage device 2 the feed path speed $v_Z$ corresponds to the storage path speed $v_{S1}$ of the first storage path 24. The discharge belt speed $v_{A1}$ of the first discharge belt 28a is equal to or higher than the storage path speed $v_{S1}$, and the discharge belt speed $v_{A2}$ of the second discharge belt 28b is equal to or higher than the discharge belt speed $v_{A1}$ of the first discharge belt 28a, the discharge belt speed $v_{A2}$ corresponding to the speed of the downstream work station AN. The second storage path 26 is not activated during normal operation, i.e. the storage path speed $v_{S2}$ of the second storage path 26 is equal to zero.

FIGS. 3, 4, 5 and 5 show the flow of the bottles during the storing operation of the storage device 2. In case of malfunction of the downstream work station AN the bottles 4 are pushed from the first storage path 24 onto the second storage path 26 (cf. FIG. 3). During the storing operation the second storage path 26 is operated at a storage path speed $v_{S2}$ which is smaller than the storage path speed $v_{S1}$ of the first storage path 24.

With a continuing malfunction of the downstream work station AN, and with a continuous supply of further bottles via the feed path 18, the bottles will accumulate on the second discharge belt 28b and, by necessity, on the first discharge belt 28a. At the same time the bottles are still redirected onto the second storage path 26 (cf. FIG. 4). The reservoir formed by the first storage path 24 and the second storage path 26 will be further filled in the case of a continuing malfunction of the downstream work station AN (cf. FIGS. 5 and 6).

As soon as the downstream work station AN is again operating under normal conditions, the emptying or unstoring operation of the storage device 2 will set in.

Figure 8:
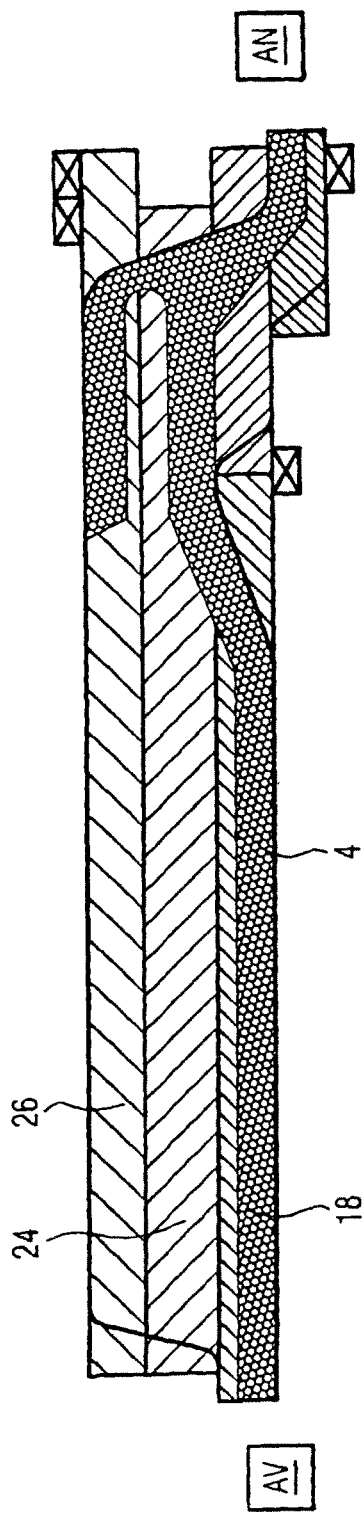

During the unstoring operation of the storage device 2 the paths are operated such that the storage path speed $v_{S1}$ of the first storage path 24 is higher than the feed speed $v_Z$ of the feed path 18. The feed speed $v_Z$ is however higher than the storage path speed $v_{S2}$ of the second storage path 26. At the same time the discharge belt speed $v_{A1}$ of the first discharge belt 28a is higher than the storage path speed $v_{S1}$, and the discharge belt speed $v_{A2}$ of the second discharge belt 28b is higher than the discharge belt speed $v_{A1}$. The reservoir is thereby emptied gradually (cf. FIG. 7). As can be seen in FIG. 7, the reservoir is first emptied in the area of the first storage path 24. With a progressing evacuation of the reservoir the state as shown in FIG. 8 is attained. As soon as bottles 4 are no longer stored by the second storage path 26, whereby the normal operation of the storage device 2 has been attained, the speed $v_{S2}$ of the second storage path 26 will be slowed down.

Figure 9:
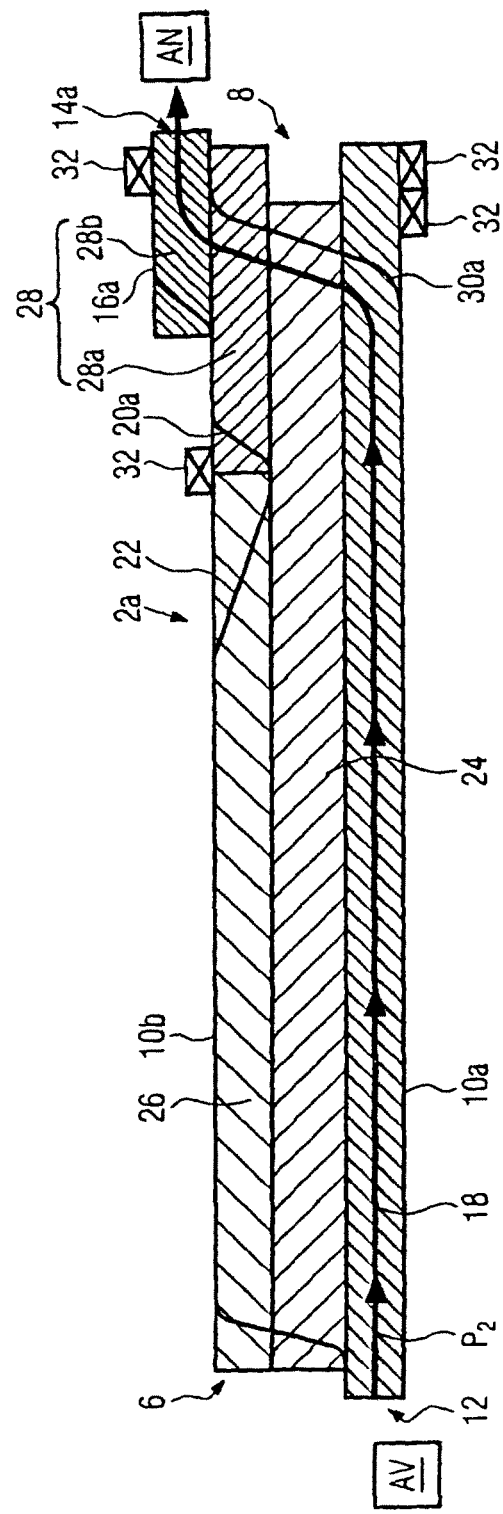
FIG. 9 is a top view on a second embodiment of the storage device.

FIG. 9 shows a second embodiment of a storage device. The storage device 2a also comprises a first end 6, a second end 8 and two opposite longitudinal sides 10a, 10b, with a lateral inlet 12 being formed next to the longitudinal side 10a.

A feed path 18 extends between the inlet 12 and an outlet guide 30a. A first storage path 24 is provided directly next to the feed path 18. A second storage path 26 is formed next to said first storage path 24. The downstream end of the second storage path 26 has formed thereon a storage path guide 20a that has the shape of an inverted U with an elongated leg 22. The leg 22 is connected with its one end to the longitudinal side 10b and forms a guide surface. The other end of the leg 22 terminates in the area of the first storage path 24.

Downstream of the second storage path 26, and in a longitudinal extension thereto, a discharge path 28 is formed that is subdivided into a first discharge belt 28a and a second discharge belt 28b. The second discharge belt 28b is arranged directly next to the side wall 16a.

In this storage device 2a the outlet guide 30a is thus formed on the end of the feed path 18, of the first storage path 24 and of the discharge belt 28a. The outlet guide 30a extends from the first longitudinal side 10a via the feed path 18, the first storage path 24 and the first discharge belt 28a up to the second discharge belt 28b, so that the outlet 14a is formed by the outlet guide 30 and the side wall 16a.

The mode of operation of the device 2a shall now be described.

The movement path P1 shows the path of the bottles 4 through the storage device 2a during normal operation. Thus the bottles 4 are introduced through the feed path 18 into the storage device 2 at the inlet 12 and moved in a straight line up to the outlet guide 30a through the supply path 18. When reaching the outlet guide 30a, the bottles 4 are moved sideways. This sideward movement will be continued until the bottles 4 have been redirected to the second discharge belt 28b via the first storage path 24 and the first discharge belt 28a. The bottles 4 are then transported by this second discharge belt 28b in a straight line to the downstream work station AN.

During the normal operation of the storage device 2a the speeds of the various paths behave similar to the speeds of the paths of the storage device 2 according to the first embodiment.

In case of a malfunction of the downstream workstation AN the bottles are pushed from the first storage path 24 onto the second storage path 26.

As soon as the downstream work station AN is again operated under normal conditions, the unstoring operation of the storage device 2a will set in.

During the unstoring operation of the storage device 2a the bottles are redirected from the second storage path 26 via the storage path guide 20a to the first storage path 24. The bottles are then transferred via the first storage path 26 in a straight line up to the outlet guide 30a and through the outlet guide 30a onto the discharge path 28. As soon as bottles are no longer stored on the second storage path 26, whereby normal operation of the storage device 2a has been attained, the speed $v_{S2}$ of the second storage path 26 will be slowed down. In a way similar to the storage device 2 according to the first embodiment, the second storage path 26 is also operated in the storage device 2a during normal operation at a speed that is lower in comparison with the speed during the unstoring operation.

In all embodiments a stepwise control is also possible instead of a continuous control option for the feed speed $v_Z$ of the feed path 18.

LIST OF REFERENCE NUMERALS 2, 2a storage device
4 bottles
6 first end
8 second end
10a, 10b longitudinal sides
12 inlet
14, 14a, outlet
16, 16a side wall
18 feed path
20, 20a storage path guide
22 leg
24 first storage path
26 second storage path
28 discharge path
28a, 28b first and second discharge belt
30, 30a outlet guide
32 drives
$v_{S1}$ storage path speed of the first storage path 24
$v_{S2}$ storage path speed of the second storage path 26
$v_Z$ feed path speed of the feed path 18
$v_{A1}$ discharge belt speed of the first discharge belt 28a
$v_{A2}$ discharge belt speed of the second discharge belt 28b
$P_1$, $P_2$ movement path of the bottles 4
AV upstream work station
AN downstream work station Note: The above List of Reference Numbers is provided simply for reference purposes only, and the names provided for the respective reference number are not in any way intended to limit the attached claims.

We claim:

1. A method for storing and transporting products in a low-pressure storage device, the method comprising the steps of:
    introducing the products by means of a feed path into the storage device (2) on a first end of the storage device having an inlet;
    transporting the products towards a second end of the storage device having an outlet,
    transferring the products onto a first storage path arranged next to the feed path, the products being transported in response to the storage path speed ($v_{S1}$) of the first storage path to an outlet of the storage device, and
    during the storing operation of the storage device transferring the products onto the first storage path and onto a second storage path arranged directly next thereto wherein, during normal operation of the storage device, during its storing operation and during its unstoring operation, the products leave the feed path in a first sideward movement in the half of the storage device that is the rear one in the direction of movement, and are transported in a second sideward movement, which is opposite to the first sideward movement, toward the outlet by means of an outlet guide formed at the end of the first and second storage paths.

2. The method according to claim 1, wherein during normal operation of the storage device first transferring the products from the feed path to the storage path arranged next to the feed path and from there to a discharge path arranged downstream of the feed path, and transporting the products via said discharge path to the outlet.

3. The method according to claim 1, and transporting the products in the second sideward movement at least to such an extent that they leave the storage device in an extension of the feed path.

4. The method according to claim 3, wherein the products leave the storage device at a side of the feed path opposite to the storage path arranged next to the feed path.

5. A method for storing and transporting products in a low-pressure storage device, the method comprising the steps of:
    introducing the products by means of a feed path into the storage device (2) on a first end of the storage device having an inlet;
    transporting the products towards a second end of the storage device having an outlet, transferring the products onto a first storage path arranged next to the feed path, the products being transported in response to the storage path speed (vS1) of the first storage path to an outlet of the storage device, and
    during the storing operation of the storage device transferring the products onto the first storage path and onto a second storage path arranged directly next thereto, wherein the products leave the feed path in a first sideward movement in the half of the storage device that is the rear one in the direction of movement, and are transported in a second sideward movement, which takes place in the same direction as the first sideward movement, towards the outlet, wherein during normal operation of the storage device first transferring the products from the feed path to the first storage path and from there to a discharge path arranged downstream of the second storage path, and transporting the products via the discharge path to the outlet, and wherein the products are redirected, during unstoring operation of the storage device from the second storage path via a storage path guide to the first storage path.

6. A low-pressure storage device for storing products, comprising:
    a frame with a first end, a second end, and two longitudinal sides opposite each other;
    an inlet formed on the first end;
    an outlet formed on the second end;
    at least one feed path that introduces the products at the first end into the storage device and transports the products towards the second end at a controllable feed speed ($v_Z$);
    at least one first and one second storage path having separately variable storage path speeds ($v_{S1}$, $v_{S2}$), the first storage path being formed next to the feed path such that the products are transportable to the outlet in response to the storage path speed ($v_{S1}$) of the first storage path; and the second storage path is provided directly next to the first storage path wherein the end of the storage paths has provided thereon an outlet guide which guides the products to the outlet, further comprising a storage path guide which transfers the products from the feed path to the first storage path, and wherein a discharge path is provided downstream of the storage path guide in a longitudinal extension of the feed path and next to the first storage path.

7. The low-pressure storage device according to claim 6, wherein during normal operation of the device the products are transportable in response to the feed speed ($v_Z$) of the feed path and the storage path speed ($v_{S1}$) of the first storage path to the outlet.

8. The low-pressure storage device according to claim 6, wherein the inlet is provided laterally next to one of the longitudinal sides.

9. The low-pressure storage device according to claim 6, wherein the feed speed ($v_Z$) of the feed path and the storage path speeds ($v_{S1}$, $v_{S2}$) of the first and second storage paths are infinitely variable independently of each other.

10. The low-pressure storage device according to claim 6, wherein during a storing operation of the storage device the paths are controllable such that they satisfy the following inequalities (5) and (6):

$$v_{S1} > v_{S2} \quad (5)$$

$$v_Z > v_{S1} \quad (6)$$

where
$v_{S1}$=storage path speed of the first storage path;
$v_{S2}$=storage path speed of the second storage path, and
$v_Z$=feed speed of the feed path.

11. The low-pressure storing device according to claim 6, wherein during an unstoring operation of the storage device the paths are controllable such that they satisfy the following inequalities (7) and (8):

$$v_{S1} > v_Z \quad (7)$$

$$v_Z > v_{S2} \quad (8)$$

where
$v_{S1}$=storage path speed of the first storage path;
$v_{S2}$=storage path speed of the second storage path, and
$v_Z$=feed speed of the feed path.

12. The low-pressure storage device according to claim 6, wherein during normal operation of the storage device the paths are controllable such that they satisfy the following inequalities (9) and (10):

$$v_Z \geq v_{S1} \quad (9)$$

$$v_{S1} > v_{S2} \quad (10)$$

where
$v_{S1}$=storage path speed of the first storage path;
$v_{S2}$=storage path speed of the second storage path, and
$v_Z$=feed speed of the feed path.

13. The low-pressure storage device according to claim 6, wherein each path is formed by a plurality of conveyor belts.

14. The low-pressure storage device according to claim 13, wherein the plurality of conveyor belts are each drivable at different speeds.

15. The low-pressure storage device according to claim 6, wherein the feed speed ($v_Z$) of the feed path is varied in steps.

16. A low-pressure device for storing products, comprising:
a frame with a first end, a second end, and two longitudinal sides opposite each other;
an inlet formed on the first end;
an outlet formed on the second end;
at least one feed path that introduces the products at the first end into the storage device and transports the products towards the second end at a controllable feed speed (vZ);
at least one first and one second storage path having separately variable storage path speeds (vS1, vS2),
the first storage path being formed next to the feed path such that the products are transportable to the outlet in response to the storage path speed (vS1) of the first storage path; and the second storage path is provided directly next to the first storage path, and further comprising an outlet guide which guides the products to the outlet is provided at the end of the feed path and the first storage path and wherein a storage path guide which transfers the products from the second storage path to the first storage path is provided on the downstream end of the second storage path, and wherein a discharge path is provided downstream of the storage path guide in longitudinal extension of the second storage path and next to the first storage path.

17. The low-pressure storage device according to claim 16, wherein during normal operation of the storage device the paths are controllable such that they satisfy the following inequalities (9) and (10):

$$v_Z \geq v_{S1} \quad (9)$$

$$v_{S1} > v_{S2} \quad (10)$$

where
$v_{S1}$=storage path speed of the first storage path;
$v_{S2}$=storage path speed of the second storage path, and
$v_Z$=feed speed of the feed path.

18. The low-pressure storage device according to claim 16, wherein each path is formed by a plurality of conveyor belts, and the plurality of conveyor belts are each drivable at different speeds.

19. The low-pressure storage device according to claim 16, wherein the discharge path speed of the discharge path is infinitely variable independently of the storage path speed ($v_{S1}$) of the first storage path.

20. The low-pressure storage device according to claim 19, wherein the discharge path is subdivided into at least two discharge belts arranged adjacent to each other.

21. The low-pressure storage device according to claim 20, wherein during normal operation of the storage device the two discharge belts are controllable such that they satisfy the following inequalities (1) and (2):

$$v_{A1} \geq v_{S1} \quad (1)$$

$$v_{A2} \geq v_{A1} \quad (2),$$

where
$v_{A1}$=discharge belt speed of a first discharge belt;
$v_{S1}$=storage path speed of a first storage path; and
$v_{A2}$=discharge belt speed of the second discharge belt.

22. The low-pressure storage device according to claim 20, wherein during an unstoring operation of the storage device the discharge belts are controllable such that they satisfy the following inequalities (3) and (4):

$$v_{A2} > v_{A1} \quad (3)$$

$$v_{A1} > v_{S1} \quad (4),$$

where
- $v_{A1}$ = discharge belt speed of a first discharge belt;
- $v_{A2}$ = discharge belt speed of a second discharge belt; and
- $v_{S1}$ = storage path speed of the first storage path.

23. The low-pressure storage device according to claim 16, wherein the feed speed ($v_Z$) of the feed path and the storage path speeds ($v_{S1}$, $v_{S2}$) of the first and second storage paths are infinitely variable independently of each other.

24. The low-pressure storage device according to claim 16, wherein during a storing operation of the storage device the paths are controllable such that they satisfy the following inequalities (5) and (6):

$$v_{S1} > v_{S2} \tag{5}$$

$$v_Z > v_{S1} \tag{6}$$

where
- $v_{S1}$ = storage path speed of the first storage path;
- $v_{S2}$ = storage path speed of the second storage path, and
- $v_Z$ = feed speed of the feed path.

25. The low-pressure storage device according to claim 16, wherein during an unstoring operation of the storage device the paths are controllable such that they satisfy the following inequalities (7) and (8):

$$v_{S1} > v_Z \tag{7}$$

$$v_Z > v_{S2} \tag{8}$$

where
- $v_{S1}$ = storage path speed of the first storage path;
- $v_{S2}$ = storage path speed of the second storage path, and
- $v_Z$ = feed speed of the feed path.

\* \* \* \* \*